(No Model.)
M. K. BLINN.
VALVE FOR WATER GAGES.
No. 368,373. Patented Aug. 16, 1887.
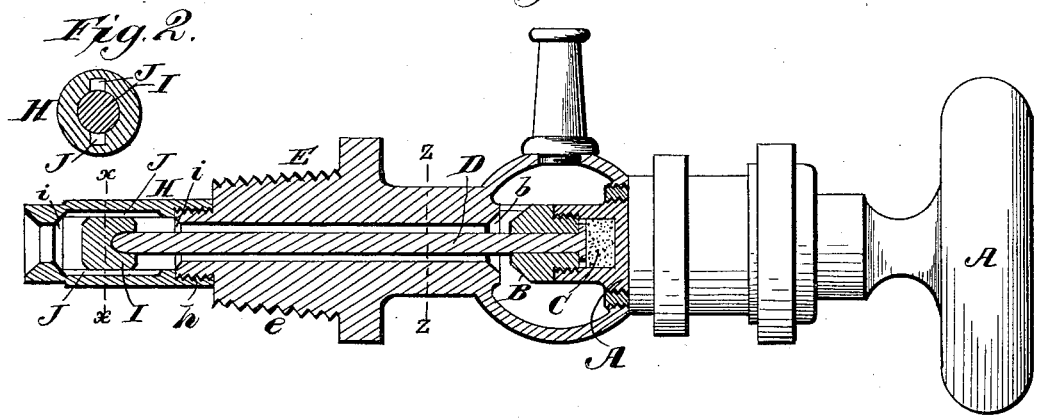
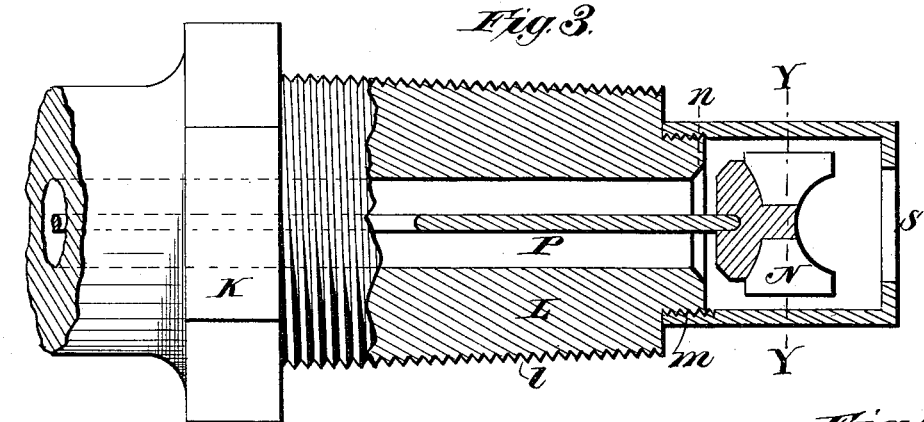
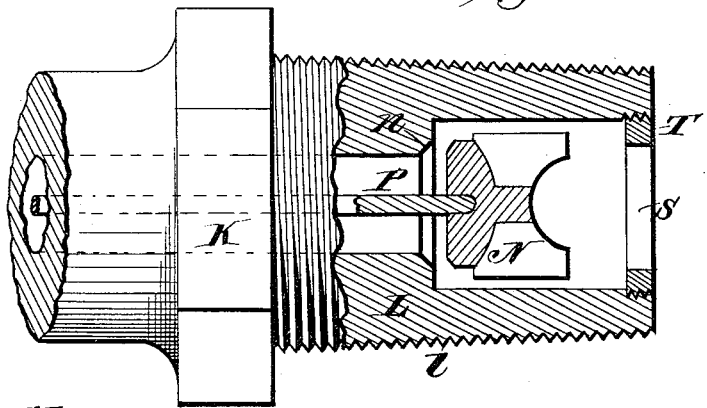
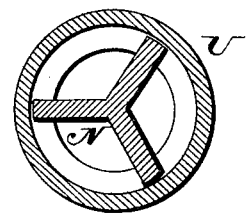
Witnesses.
J. T. Greer
William H. Tucker.
Inventor.
Marshall K. Blinn.
By
J. N. Clouse,
Atty.

UNITED STATES PATENT OFFICE.

MARSHALL K. BLINN, OF TOLEDO, OHIO.

VALVE FOR WATER-GAGES.

SPECIFICATION forming part of Letters Patent No. 368,373, dated August 16, 1887.

Application filed March 22, 1887. Serial No. 232,052. (No model.)

*To all whom it may concern:*

Be it known that I, MARSHALL K. BLINN, a citizen of the United States, residing at Toledo, in the county of Lucas and State of Ohio, have invented new and useful Improvements in Safety Stop-Valve Attachments for Steam and Hot-Water Cocks, Valves, and Gages, of which the following is a specification.

My invention relates to improvements in safety stop-valves for steam and hot water, such as are designed, constructed, and adapted to work on the inside of boilers and other tanks and receptacles for steam and hot water wherever there are outlets for cocks, valves, water-gages, check-valves, injectors, inspirators, &c.; and the objects of my invention are, first, to provide a valve that will close of itself by the pressure of the steam, as in the case of a wreck of a locomotive, when a cock or valve becomes broken off it closes down and prevents persons from being scalded to death; second, to provide a valve that may be easily closed down, when desired, for the convenience and use of disconnecting pipes and repairing and grinding valves when there is a pressure of steam on the boiler; third, to assist the working of check-valves, and especially to assist and perfect the working of injectors and inspirators. I attain these objects by the mechanism illustrated in the accompanying drawings, in which—

Figure 1 is a view of an ordinary gage-cock, the lower part of which is given in a longitudinal section showing the attachment of my safety-valve to it. Fig. 2 is a cross-section of my valve and cage attachment to Fig. 1, taken on the line X X. Fig. 3 is a view of a broken-off stub, representing that portion of a check-valve, water-gage, injector, inspirator, or other valve that is screwed into the boiler, and having in part a longitudinal section with my cage and valve attached to the end of it. Fig. 4 is a cross-section of the cage and valve, taken on the line Y Y, Fig. 3. Fig. 5 is also a view of a broken-off stub, representing that portion of a check-valve, water-gage, injector, inspirator, or other valve that is screwed into the boiler, and having in part a longitudinal section with my valve arranged on the inside of it, in all of which views like letters refer to like parts.

In Fig. 1, A is the valve-stem of the gage-cock, which is operated by the hand-wheel A'. To this stem A is screwed a valve, B, which closes down upon the seat $b$. C is a rubber cushion, on which the head of the needle D rests. E represents a sectional view of the stub end, which is provided with a thread, $e$, and a six-square, $e'$, to screw it into the boiler with. This stub E extends out and has a second thread, $h$, by means of which a valve-cage, H, is secured to it. This cage is provided with an inlet-opening and a valve-seat, $i'$, and passage-chambers J J. The end of the stub E is also provided with a valve-seat, $i$. I is a double-seated valve that works against the two seats $i$ and $i'$, and is controlled by the needle D, so that when the valve B is closed down upon the seat $b$ the needle closes the valve I upon the seat $i'$ and keeps the sediment out of the cage H, and when the valve B and needle D are drawn clear back the valve I comes down upon the seat $i$ and stops the flow out, and when the shank becomes broken off, which would be naturally on or about the broken line Z Z, the needle D comes away and the pressure of the steam closes the valve I upon the seat $i$. The rubber cushion C is designed to compress a little, so as to allow the valves B and I to seat perfectly at the same time. So, also, when the valve B becomes leaky and it is desired to regrind it, the valve I may be let down upon the seat $i$ and the needle D removed, and then it may be reground under a full head of steam.

Fig. 3 shows my valve as applied to the end of a valve, cock, check-valve, injector, inspirator, water-gage, &c., that extends into the boiler, showing a broken section, R, where it would naturally occur in a wreck of a locomotive. In this view K is an ordinary six-square, to which a wrench is applied to screw it into the boiler. L is a central cut section of the threaded portion, which is provided with the thread $l$. A smaller threaded portion on the end of L is provided with a thread, $m$, by means of which the cage M is secured in position. This cage is provided with an outlet-opening, S, in the end of it, and to the inside of it is fitted a three-wing valve, N, for which a seat, $n$, is provided at the end of the opening in L. P shows a broken and cut section of the needle bearing upon the valve N. This needle P extends out through the valve or gage, and can be drawn back and the valve N let down upon the seat n in the same manner as in Fig. 1. The cage M, I may in some cases make open and place a coiled spring behind the valve N, and the valve N may be either a three or four winged valve. In this case it is shown as a three-wing valve, as in cross-section, Fig. 4, taken on the line Y Y, Fig. 3.

Fig. 5 shows a broken section of the part that screws into the boiler the same as in Fig. 3, except that the screw portion L is shown with the valve N arranged on the inside of it and is held in by a stop-ring, T, which form I design to make use of in cases where the screw portion L is large enough to allow the valve on the inside and give sufficient passage for the steam or water.

In the use of my safety stop-valve when applied to check-valves, injectors, and inspirators I remove the needle P and give the valve N a free action to keep it clean and assist the working of the valves in the check-valve, injector, inspirator, &c.

Having described my invention and its working relations to the class of goods to which it is to be attached, what I claim as my invention, and desire to secure by Letters Patent, is—

1. In a safety stop-valve attachment to gage-cocks, water-gages, check-valves, injectors, inspirators, &c., the inside attachment of a cage, H, containing a valve, I, which works upon two seats, i i', the two or more passage-chambers J J, needle D, and rubber cushion C, in combination with the stem A, valve B, and stub end E of an ordinary gage-cock, substantially as described and specified.

2. The combination, with the valve-stem A, having the valve B, adapted to a seat, b, of the screw-threaded stub having a cage at its inner end, a valve in said cage, and a needle secured to said valve and extending loosely through the valve on the valve-stem, and provided with a rubber or other head in front of said valve, whereby the needle and its valve can move independently of the valve-stem and its valve, substantially as described.

In testimony whereof I have hereunto set my hand in the presence of two subscribing witnesses.

MARSHALL K. BLINN.

Witnesses:
   J. T. GREER,
   WILLIAM H. TUCKER.